US011338680B2

(12) United States Patent
Xu et al.

(10) Patent No.: US 11,338,680 B2
(45) Date of Patent: May 24, 2022

(54) AIR IMAGING APPARATUS FOR VEHICLE AND HUMAN-MACHINE INTERACTIVE IN-VEHICLE ASSISTANCE SYSTEM

(71) Applicant: Zhejiang Prism Holographic Technology Co., Ltd., Zhejiang (CN)

(72) Inventors: Min Xu, Zhejiang (CN); Feng Zhang, Zhejiang (CN); Zongyang Li, Zhejiang (CN); Jian Hou, Zhejiang (CN); Xianchu Peng, Zhejiang (CN)

(73) Assignee: Zhejiang Prism Holographic Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/984,114

(22) Filed: Aug. 3, 2020

(65) Prior Publication Data
US 2021/0379993 A1 Dec. 9, 2021

(30) Foreign Application Priority Data

Jun. 4, 2020 (CN) .......................... 202010499687.3

(51) Int. Cl.
*B60K 35/00* (2006.01)
*G02B 30/56* (2020.01)
(Continued)

(52) U.S. Cl.
CPC ................ *B60K 35/00* (2013.01); *B60R 1/00* (2013.01); *G02B 3/08* (2013.01); *G02B 30/56* (2020.01);
(Continued)

(58) Field of Classification Search
CPC ............ B60K 35/00; B60K 2370/1529; B60K 2370/148; B60K 2370/332;
(Continued)

(56) References Cited

U.S. PATENT DOCUMENTS

2007/0126329 A1\* 6/2007 Chuang .................. G02B 5/045
313/110
2015/0009550 A1\* 1/2015 Misago ................ G02B 26/085
359/205.1
(Continued)

FOREIGN PATENT DOCUMENTS

DE 102017211378 1/2019
DE 102017211507 1/2019
(Continued)

*Primary Examiner* — Christopher E Leiby
(74) *Attorney, Agent, or Firm* — JCIP Global Inc.

(57) ABSTRACT

Disclosed is an air imaging apparatus for a vehicle. The air imaging apparatus for vehicle being mounted in a vehicle, comprises: an image source configured for generating a graphic for display; and an imaging magnifier configured for magnifying the graphic generated by the image source and forming a real image in the air inside a vehicle. Further disclosed is a human-machine interactive in-vehicle assistance system, comprising the air imaging apparatus for vehicle as described above and a gesture recognition apparatus nearby the real image. With the enlarged image, the icons for displaying contents are also enlarged; as such, the gesture recognition apparatus can easily recognize which command icon is to be touched by the user's gesture. The gesture sliding distance is also correspondingly enlarged for the user's sliding gesture operation, which significantly lowers the requirement on the precision of the gesture recognition apparatus.

24 Claims, 15 Drawing Sheets

(51) Int. Cl.
  *B60R 1/00*       (2022.01)
  *G02B 3/08*       (2006.01)
  *G06F 3/01*       (2006.01)
  *G10L 15/22*      (2006.01)

(52) U.S. Cl.
  CPC .............. *G06F 3/017* (2013.01); *G10L 15/22* (2013.01); *B60K 2370/146* (2019.05); *B60K 2370/148* (2019.05); *B60K 2370/1529* (2019.05); *B60K 2370/23* (2019.05); *B60K 2370/332* (2019.05); *B60R 2300/205* (2013.01)

(58) Field of Classification Search
  CPC .......... B60K 2370/146; B60K 2370/23; B60K 2370/1464; G02B 30/56; G02B 3/08; B60R 1/00; B60R 2300/205; G06F 3/017; G10L 15/22
  See application file for complete search history.

(56) References Cited

U.S. PATENT DOCUMENTS

| | | | |
|---|---|---|---|
| 2017/0059859 A1* | 3/2017 | Haberl | G02B 27/0101 |
| 2017/0184844 A1* | 6/2017 | Matsushita | G02B 27/0018 |
| 2017/0322414 A1 | 11/2017 | Ishii | |
| 2018/0252918 A1 | 9/2018 | Takahashi et al. | |
| 2019/0033504 A1* | 1/2019 | Miyata | G03B 21/62 |
| 2019/0285904 A1* | 9/2019 | Kim | H04M 1/06 |
| 2020/0057546 A1* | 2/2020 | Zhao | B60K 35/00 |

FOREIGN PATENT DOCUMENTS

| | | |
|---|---|---|
| EP | 0309528 | 4/1989 |
| JP | H03209210 | 9/1991 |
| JP | 2002052954 | 2/2002 |
| JP | 2007272061 | 10/2007 |
| JP | 2014043205 | 3/2014 |
| JP | 2016055868 | 4/2016 |
| JP | 2017087826 | 5/2017 |
| JP | 2019518691 | 7/2019 |
| JP | 2020013118 | 1/2020 |
| WO | 2018179786 | 10/2018 |
| WO | 2019107295 | 6/2019 |

* cited by examiner

AIR IMAGING APPARATUS FOR VEHICLE AND HUMAN-MACHINE INTERACTIVE IN-VEHICLE ASSISTANCE SYSTEM

CROSS-REFERENCE TO RELATED APPLICATION

This application claims the priority benefit of China application serial no. 202010499687.3, filed on Jun. 4, 2020. The entirety of the above-mentioned patent application is hereby incorporated by reference herein and made a part of this specification.

FIELD

Embodiments of the present disclosure relate to an air imaging apparatus for vehicle and a human-machine interactive in-vehicle assistance system.

BACKGROUND

Air imaging mechanisms are widely applied in various fields. For example, in a vehicle, the air imaging apparatus (e.g., a head-up display, HUD) presents some vehicle statistics in the driver's forward line-of-sight. However, the graphics presented by such apparatus are virtual images, seemingly far away from the driver, rendering touch operations impossible.

With advance of technologies, the air imaging mechanisms that presenting virtual images are modified to dihedral corner reflectors or rectangular reflectors that form real images, thereby achieving human-machine interaction. In general, what is presented by the image source is a graphic, while what is formed from the graphic after passing through the imaging apparatus is an image, the image including an icon(s). Due to the reflection of the dihedral corner reflectors and rectangular reflectors, the formed real image is of the same size as the graphic displayed in an image source. Due to the crowded space utilization in current vehicles, it is hard to squeeze out a relatively large space to arrange an air imaging apparatus of an appropriate size, such that the final formed image is very small. The unsatisfactory accuracy of a gesture recognition apparatus makes things even worse, because recognition errors or failures frequently occur. For example, when the user touches an icon that is intended to execute, an icon which is too small or an user finger which is relatively large would cause a mistouch on a surrounding icon, such that the gesture recognition apparatus cannot determine which command icon the user intends to touch. For another example, when the user makes a sliding gesture to switch between pages, as the smaller icons render a shorter finger sliding distance, it is likely that the gesture recognition apparatus would fail to detect the sliding action. The problems above significantly deteriorate user experience.

SUMMARY

An object of the present disclosure is to provide an air imaging apparatus for vehicle and a human-machine interactive in-vehicle assistance system to effectively address the inefficient gesture recognition issue existing in conventional in-vehicle interactive systems.

To solve the above and other technical problems, the present disclosure is implemented by the technical solutions below: an in-vehicle air imaging apparatus for vehicle, comprising:

an image source configured for generating a graphic for display;

and an imaging magnifier configured for magnifying the graphic generated by the image source and forming a real image in the air inside a vehicle.

Preferably, the imaging magnifier is selected from a group consisting of: a Fresnel lens, a binary diffractive lens, a spherical lens, an aspherical lens, a free-formed surface lens or a flat panel micro lens, all of which are single-element imaging amplifiers capable of achieving a relatively high imaging quality.

Preferably, the imaging magnifier is a Fresnel lens group comprising at least two Fresnel lenses arranged in parallel, each of the Fresnel lenses comprising a substrate and straight teeth arranged in parallel on the substrate, the straight teeth of one Fresnel lens being not parallel to the straight teeth of its neighboring Fresnel lens. Instead of imaging by reflection as conventional rectangular reflectors or dihedral corner reflectors, the refraction in the Fresnel lens group forms a magnified real image in the air, such that a significantly larger image may be obtained in the case of a relatively small image source. Compared with conventional air imaging systems, the Fresnel lens group may effectively reduce the weight of the whole apparatus and thus may effectively reduce manufacturing costs. Compared with typical Fresnel lenses with annular teeth and stacked in parallel, which only perform magnification by ratios, the Fresnel lens group in the air imaging apparatus for vehicle adopts a straight-teeth structure, wherein the straight teeth of one Fresnel lens are not parallel to the straight teeth of its neighboring Fresnel lens, such that light passing through the first Fresnel lens is corrected by the second Fresnel lens, which may effectively reduce aberration to obtain a clearer image, and which also facilitates distortion correction to guarantee a relatively high definition around the image.

Preferably, the straight teeth of one Fresnel lens are arranged to be perpendicular to the straight teeth of its neighboring Fresnel lens. The quality of the image is the best when the straight teeth of its neighboring Fresnel lens are perpendicular to each other, which may avoid tilting and rotating of the image.

Preferably, a ridge line is arranged at the top end of each of the straight teeth distant from the substrate, wherein the ridge line is a straight line parallel to the substrate. Such arrangement facilitates light refraction and convergence, achieves a better image correction effect, and forms a clearer image.

Preferably, the straight teeth are of a triangular-prism shape with one side being closely attached to the substrate. The triangular-prism straight teeth are easy to manufacture with a good aberration reduction effect and a higher yield.

Preferably, the cross section of each of the straight teeth includes a base and two sides. The base and the two sides are joined end to end. The base is closely attached to the substrate. One of the two sides is an arc, and the other side is an arc or a straight line. As the arc has a better aberration reduction effect than a straight line, it is preferable that the two sides are both arcs.

Preferably, two neighboring Fresnel lenses are oppositely arranged, or, two neighboring Fresnel lenses are arranged in the same direction, or two neighboring Fresnel lenses are arranged facing away from each other. The opposite arrangement may achieve an optimal optical property. The facing-away arrangement may better fix the relative position between the two Fresnel lens. The same-direction arrangement can also achieve a better optical effect and facilitate stacking of multiple Fresnel lenses.

Preferably, the two Fresnel lenses are closely attached together; or, the two Fresnel lenses are spaced with a gap. The close attachment may reduce the thickness of the Fresnel lens group as much as possible to make the whole apparatus thinner.

Preferably, the imaging magnifier is a lens array, comprising a plurality of lenses, all of the lenses being arranged in a matrix. Compared with using a single-element Fresnel lens as the imaging unit, the lens array comprising a plurality of lenses arranged in matrix may render a more detailed real image and effectively reduce aberration, thereby achieving a more definite image.

Preferably, the lens is a micro lens or a Fresnel lens. The micro lens enables more lenses to be assembled on the lens array to improve the details of the image. The Fresnel lens, due to its low price and ease of manufacture, enables the whole lens array to be thinner.

Preferably, the imaging magnifier is selected from a group consisting of: a Fresnel reflector, a binary diffractive reflector, a spherical reflector, an aspherical reflector, or a free-formed surface reflector. Thanks to the principle of reflection and magnification, the relative position between the image source and the imaging magnifier may be arranged more flexibly.

Preferably, the in-vehicle air imaging apparatus for vehicle further comprises a first reflector disposed in an optical path between the image source and the imaging magnifier. By changing the relative positions between the image source and the imaging magnifier, they are easier to lay out in the restricted space inside the vehicle.

Preferably, the in-vehicle air imaging apparatus for vehicle further comprises a second reflector disposed in the optical path between the imaging magnifier and the real image to adjust the relative position between the real image and the imaging magnifier.

Preferably, the second reflector is a vehicle windshield. By making full use of the windshield to reflect, arranging an additional reflection element becomes unnecessary. By making full use of the existing devices in the vehicle to vary the imaging position simplifies the structure of the apparatus and reduces expenses.

Preferably, a position corresponding to the imaging magnifier on the vehicle windshield is provided with a wedge-shaped glass. The wedge-shaped glass prevents potential double-image on the windshield.

Preferably, the image source comprises one or more light emitting sources, and an appropriate imaging source is selected dependent on the required accuracy of the image to display.

Preferably, if the image source comprises a plurality of light-emitting sources, the light emitting sources are arranged in a matrix, which facilitates editing the contents to be displayed by different light emitting sources.

Preferably, the imaging source is selected from a group consisting of: an LCD, an LED, an OLED, an LCOS, or a projector, which lowers expense and threshold for the imaging source and thus offers a wider adaptability.

Preferably, the projector is a digital light processing (DLP) projector or a laser MEMS (Microelectromechanical Systems) module. A diffuser is additionally provided between the projector and the imaging magnifier to improve the diffusion angle of the image source and expand the angle for naked eyes to view the real image.

Preferably, the transmittance of the diffuser is in a range of 70%±10%. If the transmittance is too high, the viewer may see a bright projecting point of the projector. If the transmittance is too low, the image will be blurred and darkened.

Preferably, a size of the imaging magnifier is greater than a size of the formed real image, such that the user may view a full image.

A human-machine interactive in-vehicle assistance system is provided, comprising the in-vehicle air imaging apparatus stated above, and a gesture recognition apparatus nearby the real image.

Preferably, the human-machine interactive in-vehicle assistance system further comprises a voice recognition apparatus that captures user's voice and a display content of the real image. By recognizing the user's voice commands and the contents of the real image, the voice recognition apparatus improves user experience.

Preferably, the image source is installed in a dashboard in the vehicle, the imaging magnifier is installed in the dashboard, the gesture recognition apparatus is mounted on the dashboard nearby the real image or on a roof in the vehicle. Such arrangement protects the image source from accidental damages, and meanwhile prevents blocking the position of the imaging magnifier. With such arrangement, the gesture recognition apparatus will not be blocked from recognizing user commands, which facilitates user operation.

Compared with conventional technologies, the present disclosure offers the following advantages. With the imaging magnifier as an imaging unit, the image passing through the imaging magnifier becomes a magnified real image, thereby realizing a relatively large image from a relatively small image source. In other words, a larger image can be achieved without changing a size of the original air imaging apparatus, such that the air imaging apparatus according to the present disclosure is particularly applicable for a vehicle where the available space is limited. With the larger image, the displayed content becomes even richer. The larger image may offer a clearer view to the user; meanwhile, an alarm content becomes more noticeable to the driver and to other passengers in the driver, such that the other passengers may also alarm the driver.

With the enlarged image, the icons in the image are also enlarged. In further conjunction with the gesture recognition apparatus, it can be easily recognized which command icon is to be touched by the user's gesture. The gesture sliding distance is also correspondingly enlarged for the user's sliding gesture operation, which significantly lowers the requirement on the precision of the gesture recognition apparatus, such that the gesture recognition apparatus can recognize user operations more accurately and thus enhance user experience.

DETAILED DESCRIPTION OF EMBODIMENTS

Figure 1:
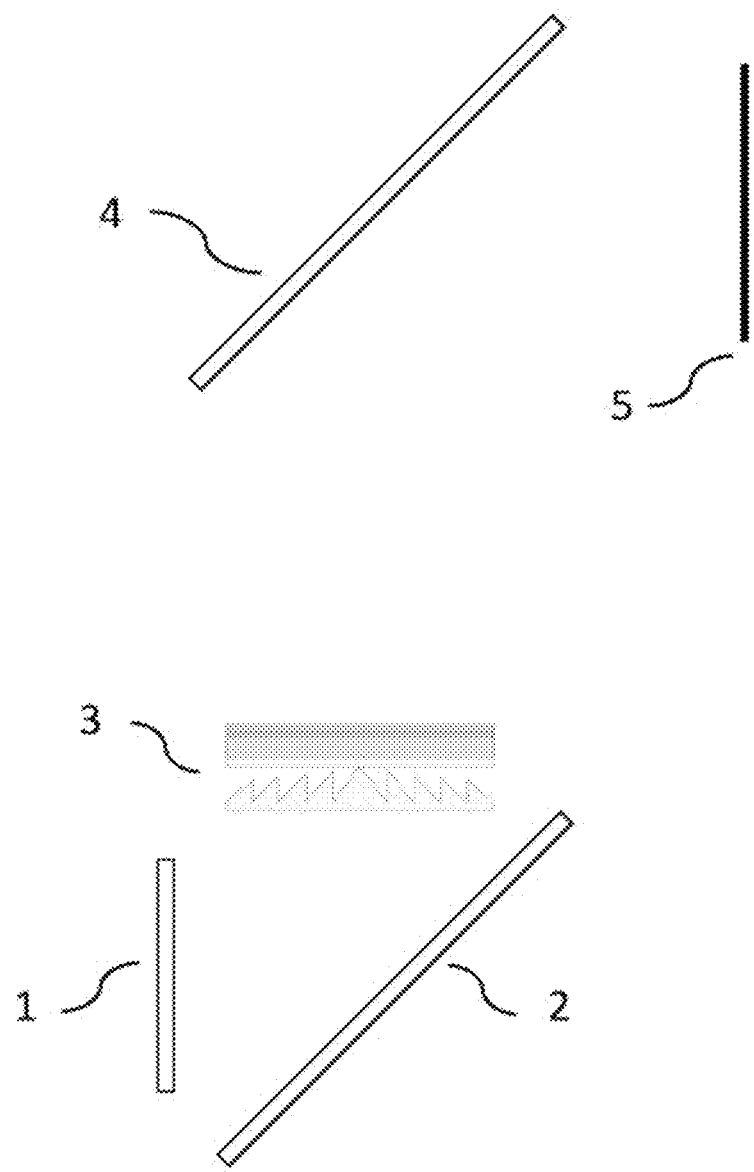
FIG. 1 shows a structural schematic diagram of an air imaging apparatus for a vehicle according to the first embodiment of the present disclosure.

Hereinafter, the embodiments of the present disclosure will be described in detail. Exemplary embodiments are shown in the drawings. The embodiments described with reference to the accompanying drawings are intended to explain the present disclosure, which shall not be construed as limiting the present disclosure.

In the description of the present disclosure, it needs to be understood that the oriental or positional relationships indicated by the terms "center," "longitudinal," "transverse," "length," "width," "thickness", "upper," "lower," "front," "rear," "left," "right," "vertical," "horizontal," "top," "bottom," "inner," "clockwise," "counterclockwise," etc. are oriental and positional relationships based on the drawings, which are intended only for facilitating or simplifying description of the present disclosure, not for indicating or implying that the devices or elements have to possess those specific orientations and have to be configured and operated with such specific orientations. Therefore, they should not be understood as limitations to the present disclosure.

Besides, the terms "first" and "second" are only used for description purposes, which shall not be construed as indicating or implying a relative importance or implicitly indicating the number of the technical features indicated. Therefore, the features limited by "first" and "second" may explicitly or implicitly include at least one of such features. In the description of the present disclosure, "plurality" indicates at least two, for example, two, three, etc., unless otherwise indicated.

In the present disclosure, unless otherwise explicitly provided and limited, the terms such as "mount," "connected," "connection," and "fix" should be understood broadly, which, for example, may refer to a secured connection, a detachable connection, or an integral connection; which may be a mechanical connection or an electrical connection; which may be a direct connection or an indirect connection via an intermediate medium; which may also be a communication between the insides of two elements or the interactive relationships between the two elements, unless otherwise explicitly defined. To a person of normal skill in the art, specific meanings of the above terms in the present disclosure may be understood based on specific situations.

First Embodiment

Figure 2:
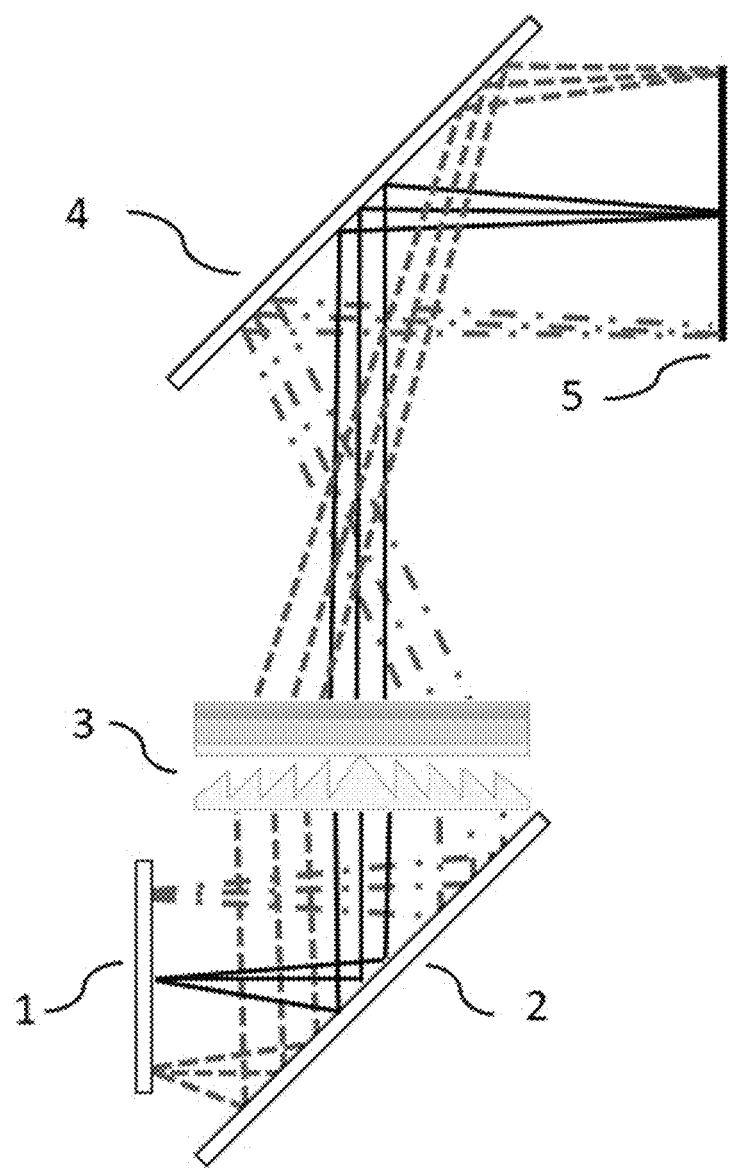
FIG. 2 shows an imaging principle diagram of the air imaging apparatus for a vehicle according to the first embodiment of the present disclosure.

Referring to FIGS. 1 and 2, an air imaging apparatus for vehicle according to the first embodiment is illustrated, the air imaging apparatus for vehicle being mounted in a vehicle and comprising: an image source 1 configured for generating a to-be-displayed graphic; and an imaging magnifier 3 configured for magnifying the graphic generated by the image source 1 and forming a real image 5 in the air in the vehicle.

With the imaging magnifier 3 as an imaging unit, an image passing through the imaging magnifier 3 becomes a magnified real image 5, thereby presenting a relatively large image from the relatively small image source 1. In other words, a larger image can be achieved without changing the size of the original air imaging apparatus. By applying the air imaging apparatus in a vehicle, an image as large as possible may be achieved with limited space. In this way, a more definite image can be displayed, more contents can be presented in the image, and thus more services can be provided. In general, the size of the Fresnel lens group is preferably larger than the size of the formed real image 5, such that the user may view a full image.

Figure 8:
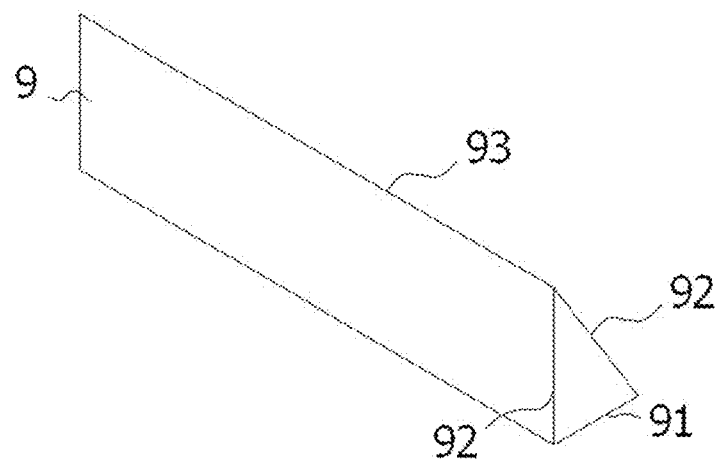
FIG. 8 shows a first form of straight teeth of the Fresnel lens in the air imaging apparatus for a vehicle according to the first embodiment of the present disclosure.
Figure 9:
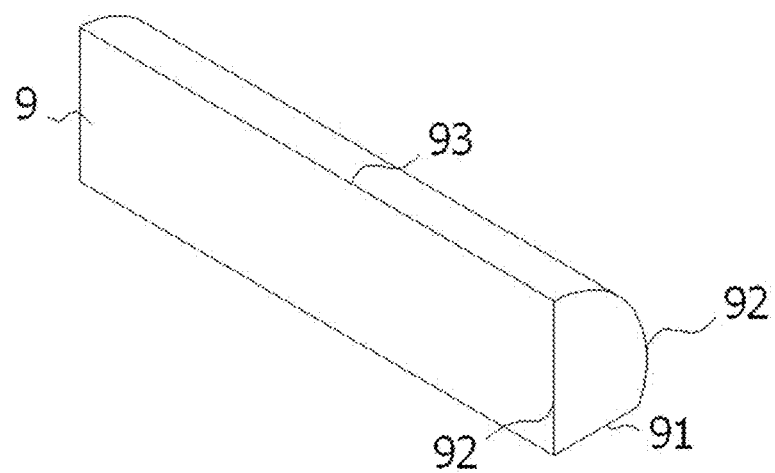
FIG. 9 shows a second form of straight teeth of the Fresnel lens in the air imaging apparatus for a vehicle according to the first embodiment of the present disclosure.
Figure 10:
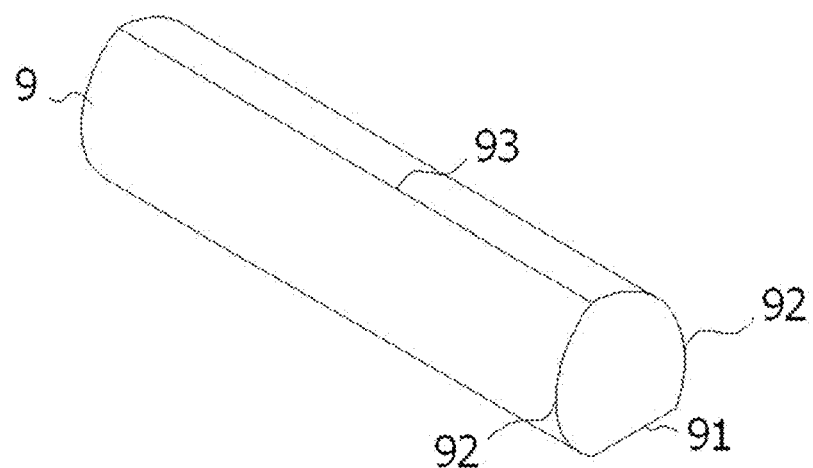
FIG. 10 shows a third form of straight teeth of the Fresnel lens in the air imaging apparatus for a vehicle according to the first embodiment of the present disclosure.
Figure 11:
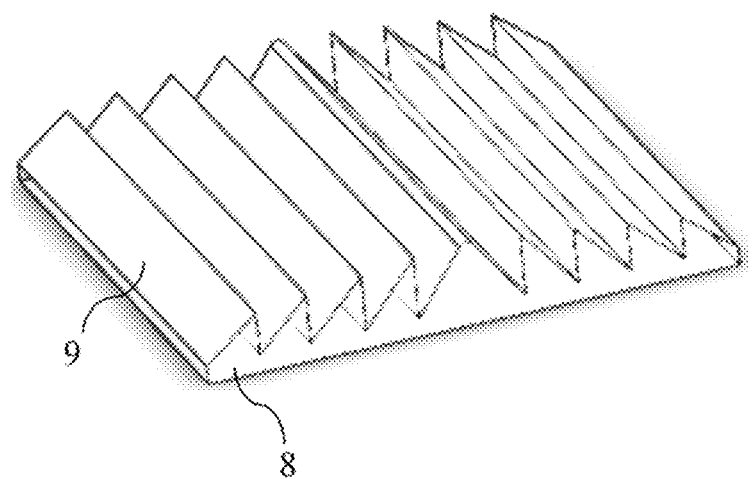
FIG. 11 shows a structural schematic diagram of a single-element Fresnel lens in the air imaging apparatus for a vehicle according to the first embodiment of the present disclosure.

In general, to form a magnified real image 5, the distance from the image source 1 to the imaging magnifier 3 is between one focal length and two focal lengths of the imaging magnifier 3. The imaging amplifier in this embodiment forms a Fresnel lens group, including at least two Fresnel lenses arranged in parallel. Each of the Fresnel lenses comprises a substrate 8 and straight teeth 9 arranged in parallel on the substrate 8. The straight teeth 9 of one Fresnel lens being not parallel to the straight teeth of its neighboring Fresnel lens. Parallel arrangement of two Fresnel lenses refers to the substrates 8 of the two Fresnel lenses being parallel to each other and the straight teeth 9 on each substrate 8 are also parallel to each other, i.e., the length directions of the straight teeth 9 being all arranged in parallel, as shown in FIG. 11. The straight teeth 9 mean that two end faces of the teeth have a completely identical shape, respective ridge lines 93 being parallel to each other, as shown in FIGS. 8 to 10.

Light is emitted from the image source 1, and after being refracted by the Fresnel lens group, forms the magnified real image 5. Instead of imaging by reflection as conventional rectangular reflectors or dihedral corner reflectors, the refraction in the Fresnel lens group forms the magnified real image 5 in the air. By obtaining an image significantly larger than the picture generated by the initially smaller image source 1, the Fresnel lens group may, compared with existing air imaging systems, effectively reduce the weight of the whole apparatus and thus may effectively reduce manufacturing costs.

The Fresnel lens group in the air imaging apparatus for a vehicle adopts straight teeth 9, wherein the straight teeth 9 of one Fresnel lens are not parallel to the straight teeth of its neighboring Fresnel lens. Compared with those Fresnel lenses with typical annular teeth and stacked in parallel, the non-parallel arrangement can effectively reduce aberration to obtain a clearer image, and meanwhile facilitates distortion correction to guarantee a relatively high definition around the image.

The image source 1 in the air imaging apparatus for a vehicle is a light emitting source 32, which may adopt any one of the following: an LCD, an LED, an OLED, or an LCOS. Such image sources 1 are relatively mature display technologies and are thus easily accessible. Besides, their expenses are easily controlled. Therefore, they are suitable for applications where the image source 1 is not very large.

Figure 5:
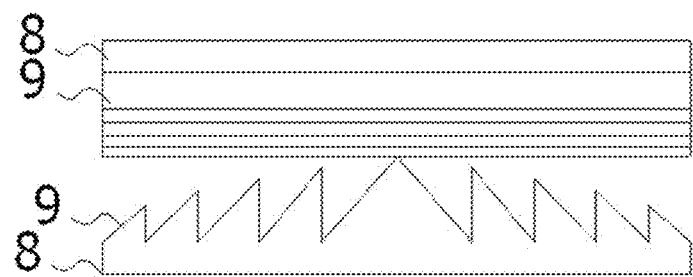
FIG. 5 shows a first combination manner of neighboring Fresnel lenses in the air imaging apparatus for a vehicle according to the first embodiment of the present disclosure.

As shown in FIG. 5, the Fresnel lens group comprises two Fresnel lenses. The two Fresnel lenses are preferably oppositely arranged, i.e., the straight teeth 9 of one Fresnel lens are opposite to the straight teeth 9 of the other Fresnel lens. The two Fresnel lenses are optically closely attached to reduce the thickness of the overall Fresnel lens group and obtain a better optical property. A gap may be between the two Fresnel lenses, with the gap being filled by glue with good light transparency. The Fresnel lens group may optionally include more than two Fresnel lenses. The number of Fresnel lenses being used is determined dependent on actual needs of imaging. Alternatively, two neighboring Fresnel lenses may be arranged in the same direction or facing away from each other.

The straight teeth 9 of the neighboring Fresnel lenses are preferably perpendicular to each other, which may be perpendicular while contacting each other, or perpendicular in space, i.e., their projections on a plane parallel to the substrate 8 are mutually perpendicular with each other. For example, all straight teeth 9 of one Fresnel lens are arranged horizontally, while all straight teeth 9 of its neighboring Fresnel lens are arranged longitudinally. Such arrangement is easy to adjust and manipulate to obtain the magnified real image 5 with a good imaging quality. The straight teeth 9 of one Fresnel lens may have an acute angle relative to the straight teeth of the other Fresnel lens. The acute angle refers to the projections of the teeth of one Fresnel lens having an acute angle relative to the projections of the teeth of the other Fresnel lens on a plane parallel to the Fresnel lens. In this way, the resulting image can tilt and rotate to meet the requirements of some special scenes.

As shown in FIG. 11, the dimensions and parameters of respective Fresnel lenses are preferably identical so that it is easy to adjust and calculate relevant parameters. However, Fresnel lenses with different dimensions and parameters may be chosen based on actual needs. In this case, the Fresnel lenses have a substantially identical structure, i.e., each Fresnel lens comprises a substrate 8 and straight teeth 9 arranged on the substrate 8. The Fresnel lenses adopted in this embodiment are somewhat different from conventional Fresnel lenses. In the conventional Fresnel lenses, a plurality of concentrically annular teeth is provided on the substrate 8, while in this embodiment, the straight teeth 9 are arranged in parallel, i.e., the teeth are not annular, but rectangular. The top ends of the straight teeth 9 distant from the substrate 8 are provided with ridge lines 93. The ridge lines 93 are straight lines parallel to the substrate 8, as shown in FIGS. 8 to 10. The cross sections of the straight teeth 9 are preferably triangular or quasi-triangular, wherein the straight teeth with a triangular cross section are of a triangular-prism shape. The quasi-triangular is formed by a base 91 and two sides 92 which join end to end, wherein the base 91 is attached to or overlap with the base 8. The two sides 92 may be both arcs, or one side 92 is an arc while the other side is a straight line. However, if the two sides 92 are both arcs, their intersection portion does not transit smoothly but maintains a ridge line 93, which may achieve a better optical property.

The heights of the straight teeth 9 on the same substrate 8 accord with the requirement of Fresnel lenses, i.e., the heights gradually decrease from the center to two sides, which means the straight tooth 9 in the middle is the highest, while the heights of the straight teeth 9 at its two sides gradually decrease. Besides, the angles between the sides 92 of the straight teeth 9 and the substrate 8 may also be different. These parameters are correspondingly tuned based on the required imaging effect. The substrate 8 may also be rectangular, circular, or of any other shape, which is determined based on the actual layout and display needs. The ridges of the straight teeth 9 may be parallel to the sides of the substrate or may be not parallel to the sides of the substrate. Alternatively, the substrate 8 and the straight teeth 9 are integrally manufactured by a material such as glass or plastics.

From the perspective of the whole air imaging apparatus for vehicle, in order to have a reasonable layout and to improve spatial utilization, a first reflector 2 may be additionally provided between the image source 1 and the imaging magnifier 3 while a second reflector 4 may be additionally provided on the optical road between the Fresnel lens group and the real image 5. The second reflector 4 may use the vehicle windshield or may be additionally provided. If the vehicle windshield is used as the second reflector, the portion of the windshield serving as a reflector is preferably arranged as a wedge structure to keep double-image away, wherein the light direction can be tuned by the first reflector and/or the second reflector.

As shown in FIG. 2, the image source 1 is vertically arranged, the Fresnel lens group is horizontally arranged. The first reflector 2 and the second reflector 4 both have a 45° angle relative to the horizontal plane. The light emitted from the image source 1, after being reflected by the first reflector 2, is vertically incident into the Fresnel lens group. After being refracted by the Fresnel lens group, the light irradiates on the second reflector 4, and is then reflected by the second reflector 4 to form the real image 5 in the air, while the user sees an image suspended in the air. The size of the real image 5 is larger than the size of the graphic generated by the image source 1, which is thus understood as a magnified real image 5.

Figure 6:
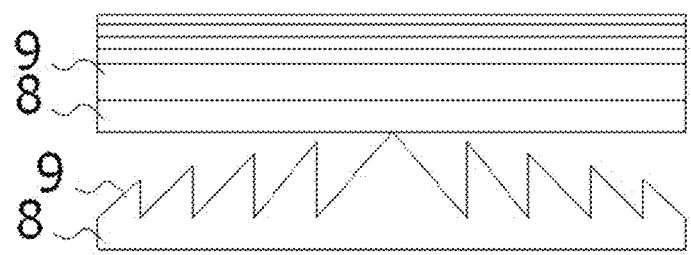
FIG. 6 shows a second combination manner of neighboring Fresnel lenses in the air imaging apparatus for a vehicle according to the first embodiment of the present disclosure.
Figure 7:
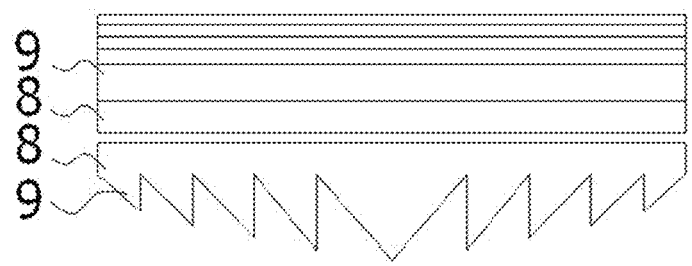
FIG. 7 shows a third combination manner of neighboring Fresnel lenses in the air imaging apparatus for a vehicle according to the first embodiment of the present disclosure.

As shown in FIGS. 6 and 7, the orientations between two Fresnel lenses may also be arranged in the same direction or facing away from each other. The same-direction arrangement facilitates parallel layout of multiple Fresnel lenses, and facilitates mounting of the Fresnel lenses during manufacturing, which are just required to lay out in the same direction. The facing-away arrangement (i.e., the substrate 8 and the substrate 8 of the two Fresnel lenses are arranged back to back, such that the two Fresnel lenses may be positioned more easily, and the assembly accuracy can also be improved.

Second Embodiment

Figure 3:
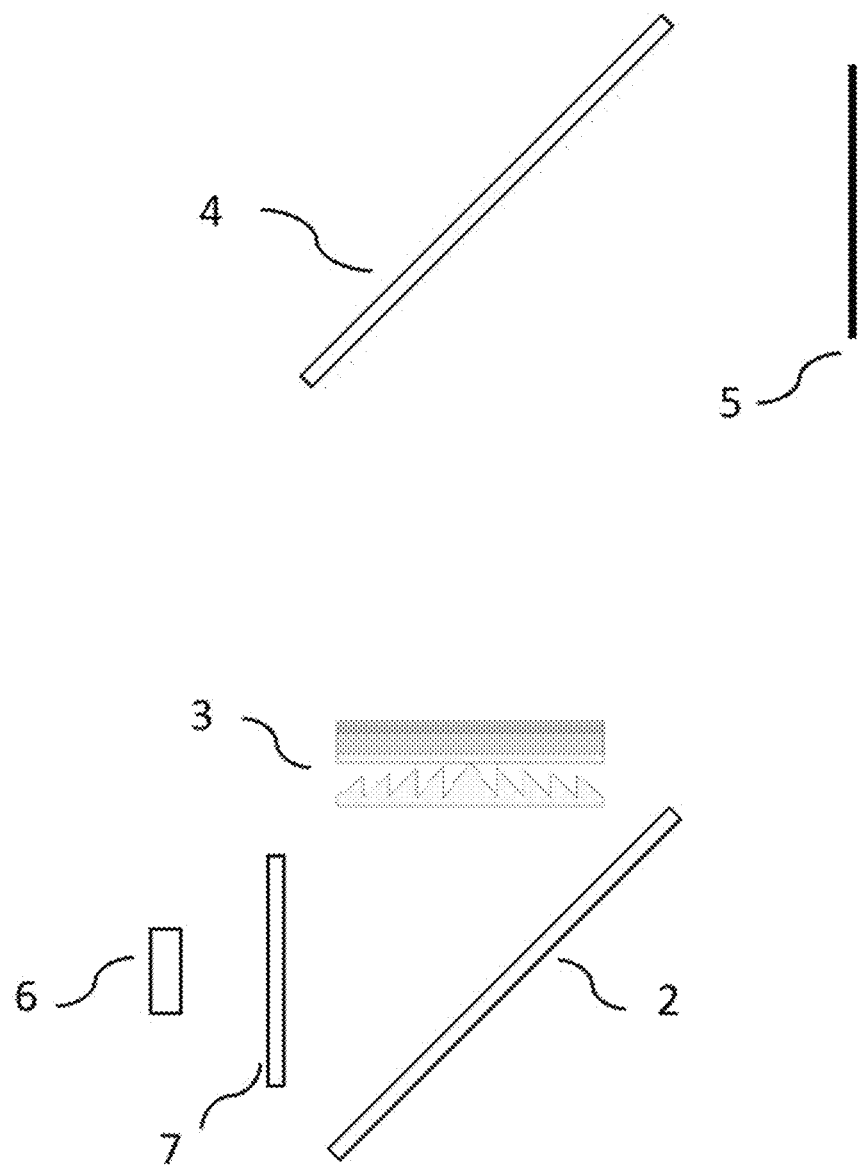
FIG. 3 shows a structural schematic diagram of an air imaging apparatus for a vehicle according to the second embodiment of the present disclosure.
Figure 4:
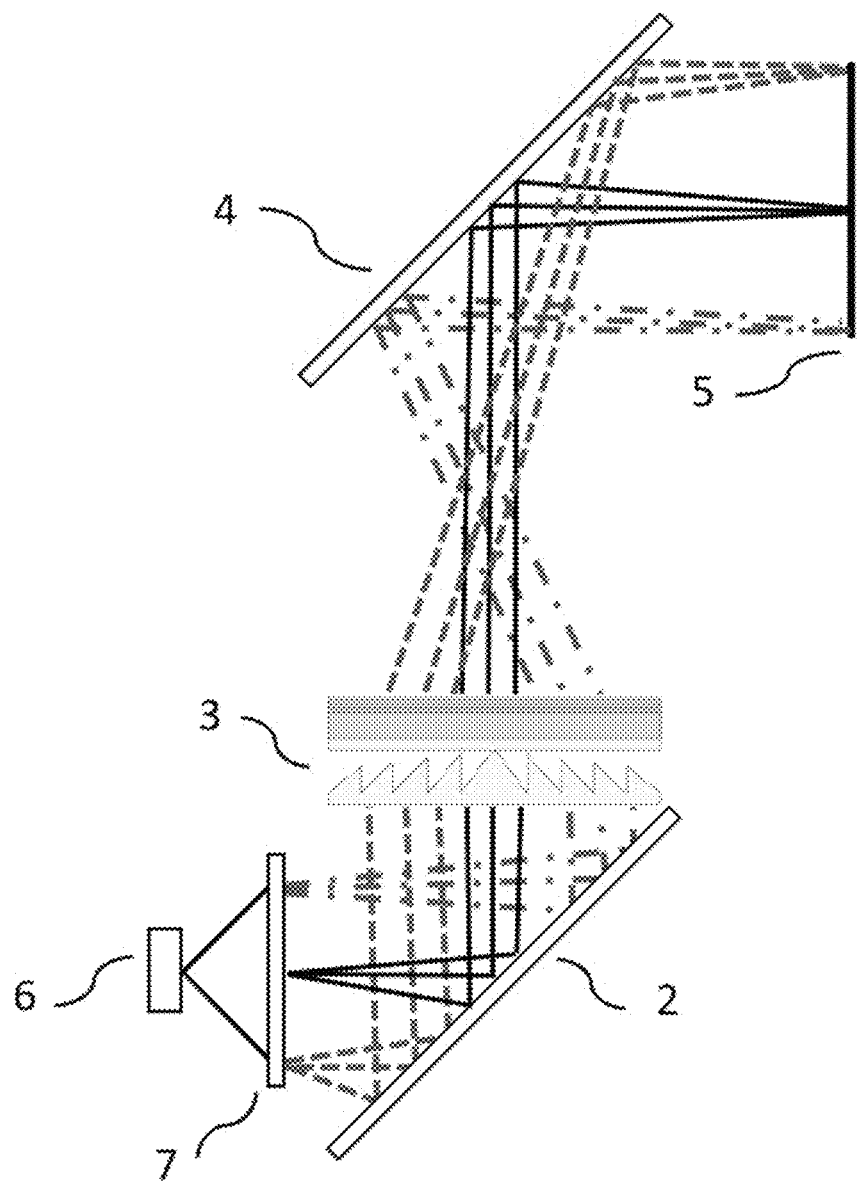
FIG. 4 shows an imaging principle diagram of the air imaging apparatus for a vehicle according to the second embodiment of the present disclosure.

As illustrated in FIGS. 3 and 4, the difference between this embodiment and First Embodiment is that the image source 1 is replaced by a projector 6, e.g., a DLP projector 6 or a laser MEMS module. Because the light emitting properties of the image source 1 is changed, a diffuser 7 is additionally provided between the projector 6 and the Fresnel lens group, such that the diffusion angle of the image source 1 is increased, which expands the angle of viewing the real image 5 with the bared eyes. In general, the light transmittance of the diffuser 7 ranges between 70%±10%. For a light transmittance higher than 80%, the user may see a bright projecting point of the projector 6, while for a light transmittance lower than 60%, the image will be blurred and darkened, affecting use by the user.

Third Embodiment

Figure 12:
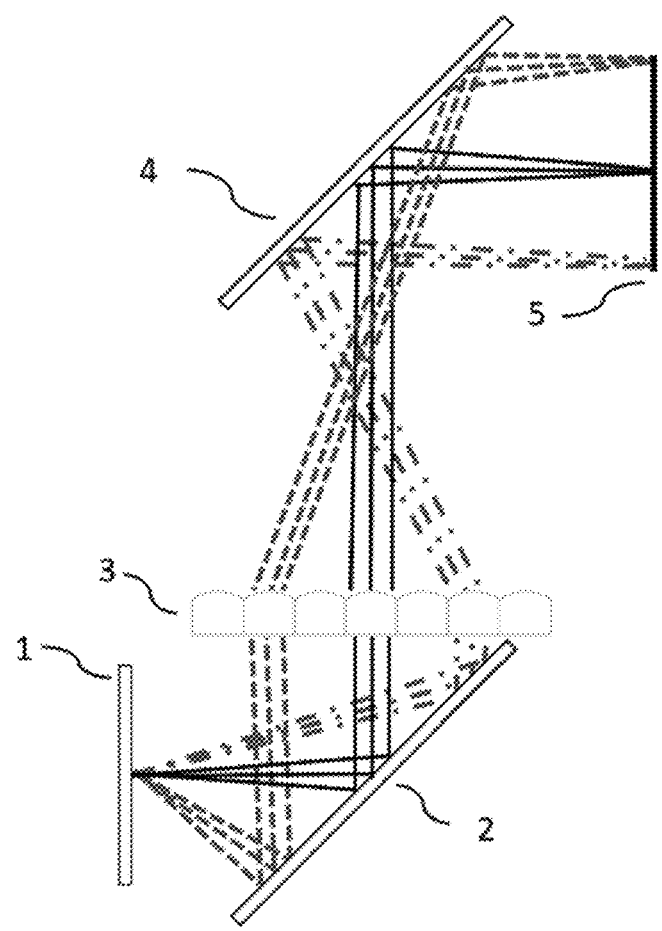
FIG. 12 shows an imaging principle of the air imaging apparatus for a vehicle according to the third embodiment of the present disclosure.
Figure 13:
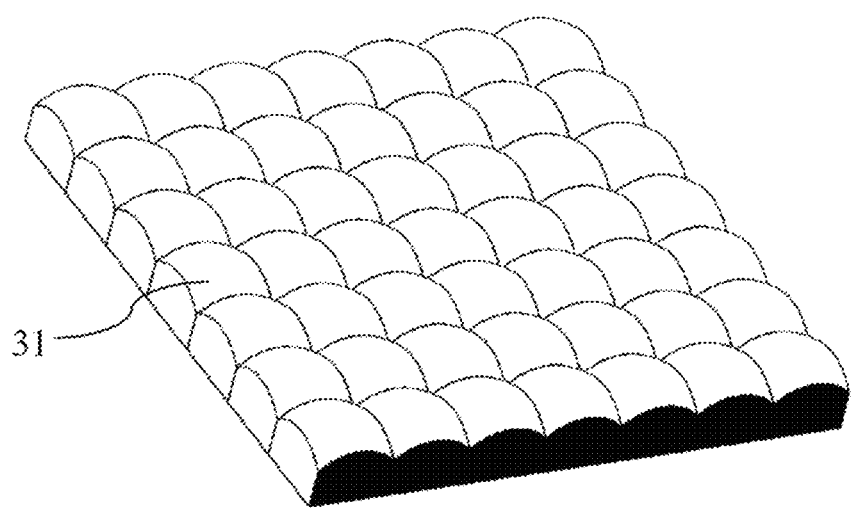
FIG. 13 shows a structural schematic diagram of a lens array formed by micro lenses in the air imaging apparatus for a vehicle according to the third embodiment of the present disclosure.
Figure 14:
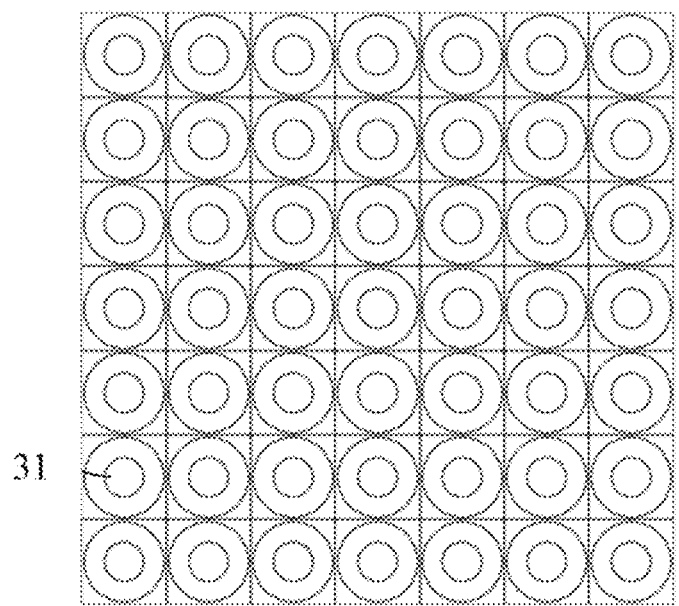
FIG. 14 shows a structural schematic diagram of a lens array formed by Fresnel lenses in the air imaging apparatus for a vehicle according to the third embodiment of the present disclosure.

As shown in FIGS. 12, 13, and 14, the difference between this embodiment and First Embodiment and Second Embodiment is that the imaging magnifier 3 is an lens array, comprising a plurality of lenses 31, all of the lenses 31 being arranged in a matrix.

To form a magnified real image 5, the lens array generally adopts the principle of convex lens, and the spacing between the image source 1 and the lens array is between one focal length to two focal lengths. The multiple lenses may be understood as a combination of a plurality of separate lenses. To achieve a better imaging effect, each lens may be made to a square shape, which may realize seamless splicing between neighboring Fresnel lenses. The arrayed arrangement is basically in a row-and-column form. In general, the number of rows is greater than or equal to two, and the number of columns is also greater than or equal to two.

As shown in FIGS. 13 and 14, the lens may be a micro lens or a Fresnel lens. The selection of the lens is dependent on the manufacturing cost of the product. The lens may also be a glass convex lens, wherein each lens may be directly integrally manufactured on one substrate 8 upon manufacturing, thereby reducing the impact of the inter-lens gap on the imaging quality. The parameters of respective lenses may be completely identical. The parameters of the lenses at different positions may be correspondingly tuned based on the characteristics of the displayed image.

Fourth Embodiment

Figure 15:
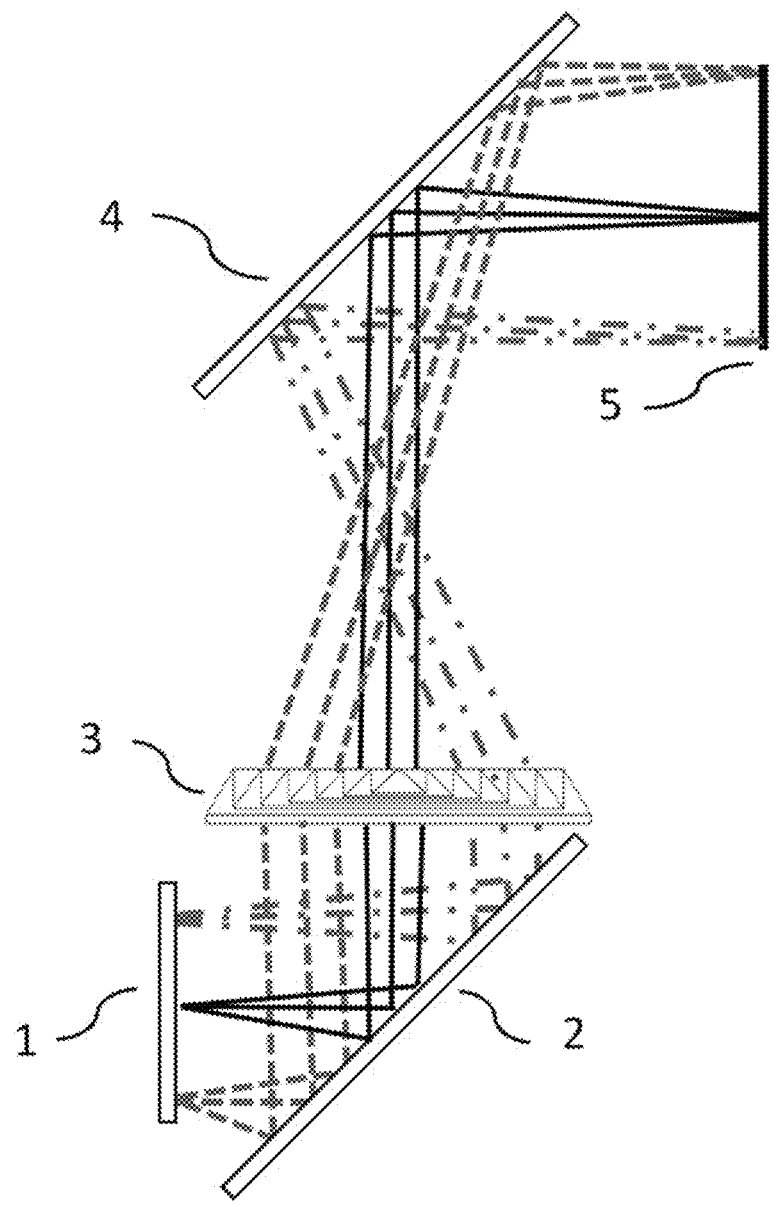
FIG. 15 shows an imaging principle diagram of an air imaging apparatus for a vehicle with an LCD, an LED, an OLED, or an LCOS according to the fourth embodiment of the present disclosure.
Figure 16:
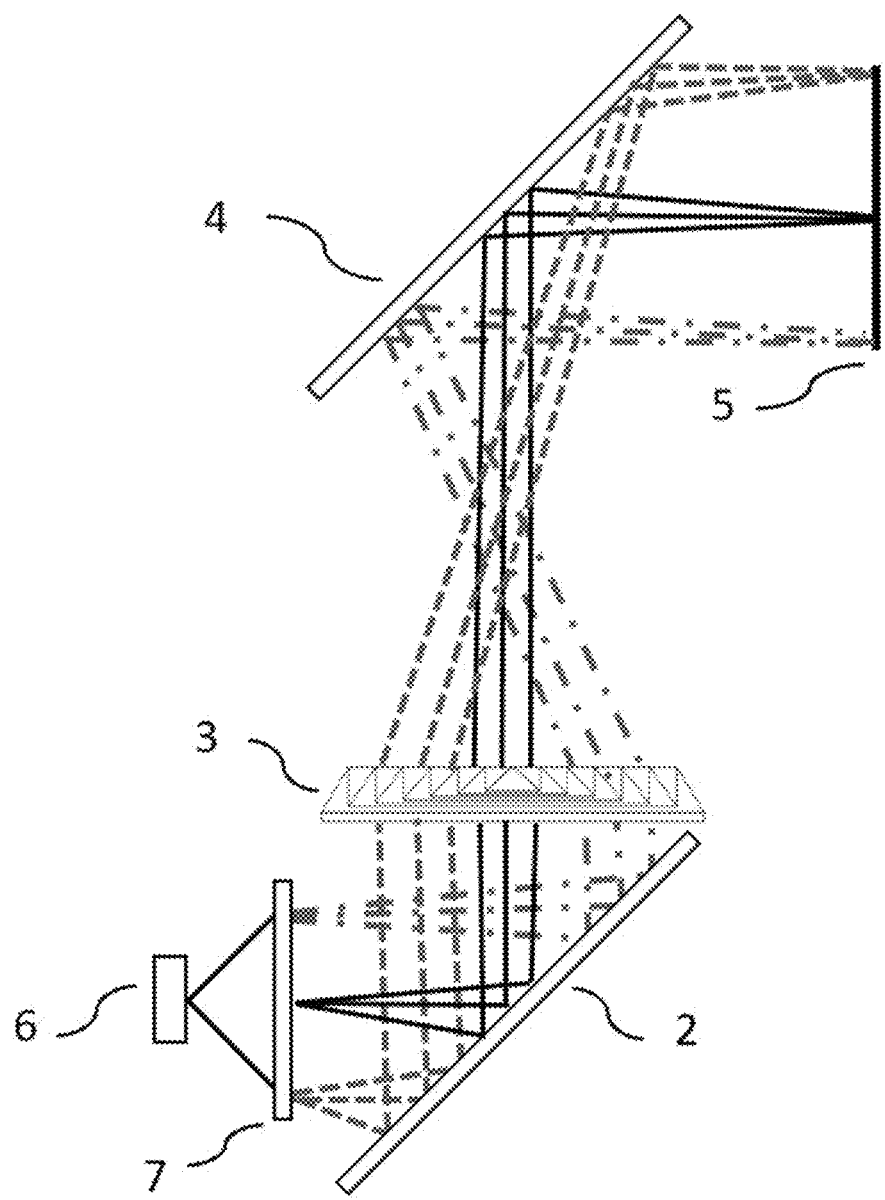
FIG. 16 shows an imaging principle of the air imaging apparatus for a vehicle in the case that the light emitting source is a projector according to the fourth embodiment of the present disclosure.

As shown in FIGS. 15 and 16, the difference between this embodiment and First Embodiment and Second Embodiment is that the imaging magnifier 3 is selected from a group consisting of: a Fresnel lens, a binary diffractive lens, a spherical lens, an aspherical lens, a free-formed surface lens or a flat panel micro lens. The imaging magnifier 3 may adopt the single-element lens or a lens group formed by stacking of the above lenses. Compared with the structures adopted in first embodiment and second embodiment, the structure of the imaging magnifier 3 in this embodiment has a simpler structure, which is applicable to a scenario where the requirement on imaging quality is not so high, thereby lowering manufacturing costs.

Fifth Embodiment

Figure 17:
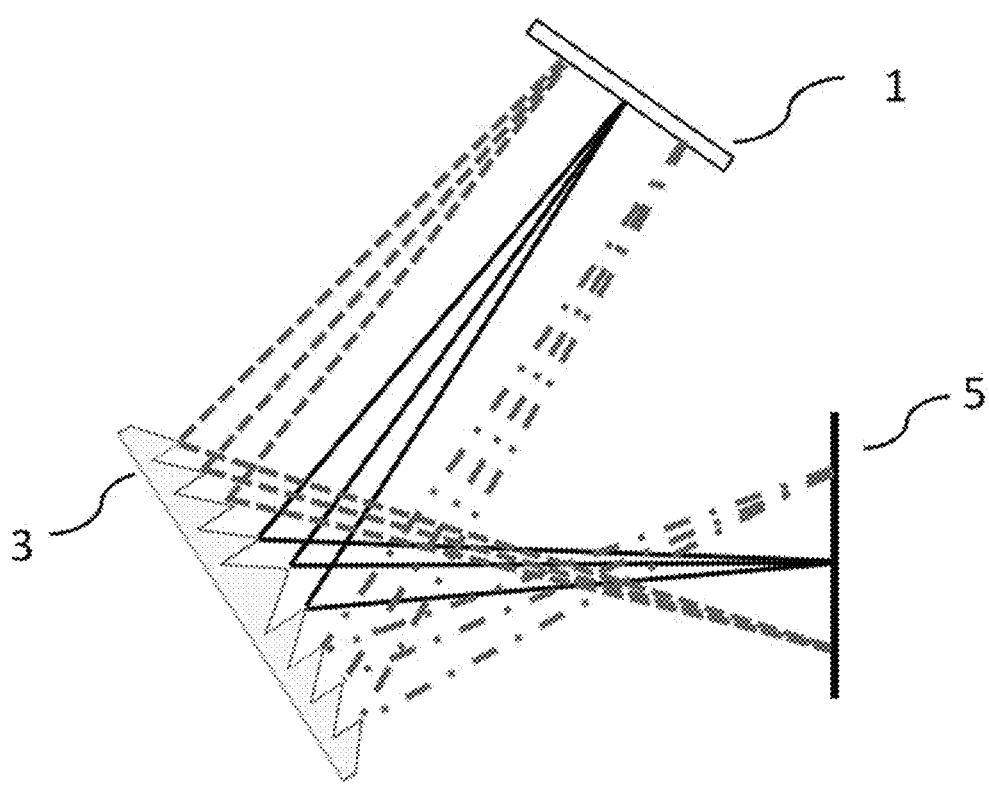
FIG. 17 shows an imaging principle of the air imaging apparatus for a vehicle with an LCD, an LED, an OLED, or an LCOS according to the fifth embodiment of the present disclosure.
Figure 18:
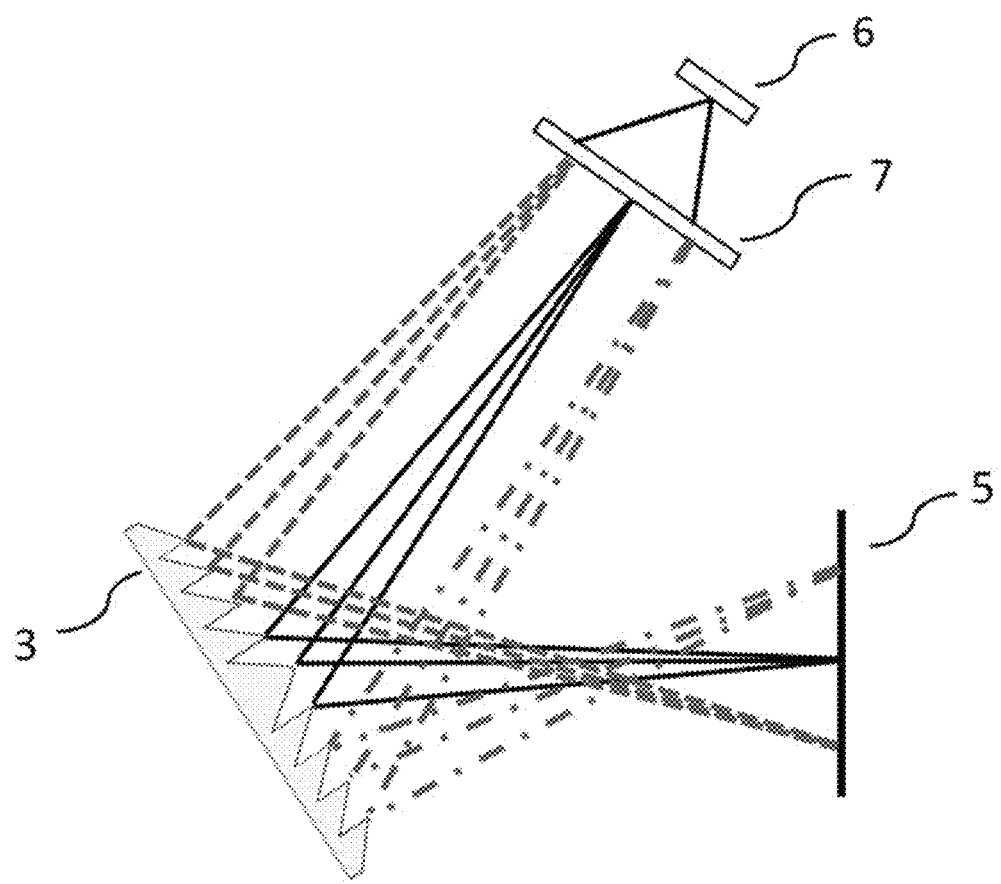
FIG. 18 shows an imaging principle of the air imaging apparatus for a vehicle when using a projector as a light emitting source according to the fifth embodiment of the present disclosure.

As shown in FIGS. 17 and 18, the difference between this embodiment and first embodiment and second embodiment is that the imaging magnifier 3 is selected from a group consisting of: a Fresnel reflector, a binary diffractive reflector, a spherical reflector, an aspherical reflector, or a free-formed surface reflector. In contrast to the lenses in the preceding four embodiments, the reflector in this embodiment may arrange the image source 1 and the image reflected by the imaging magnifier at the same side, which additionally provides a variety of positional relationships and facilitates selection with respect to different in-vehicle conditions.

Sixth Embodiment

Figure 19:
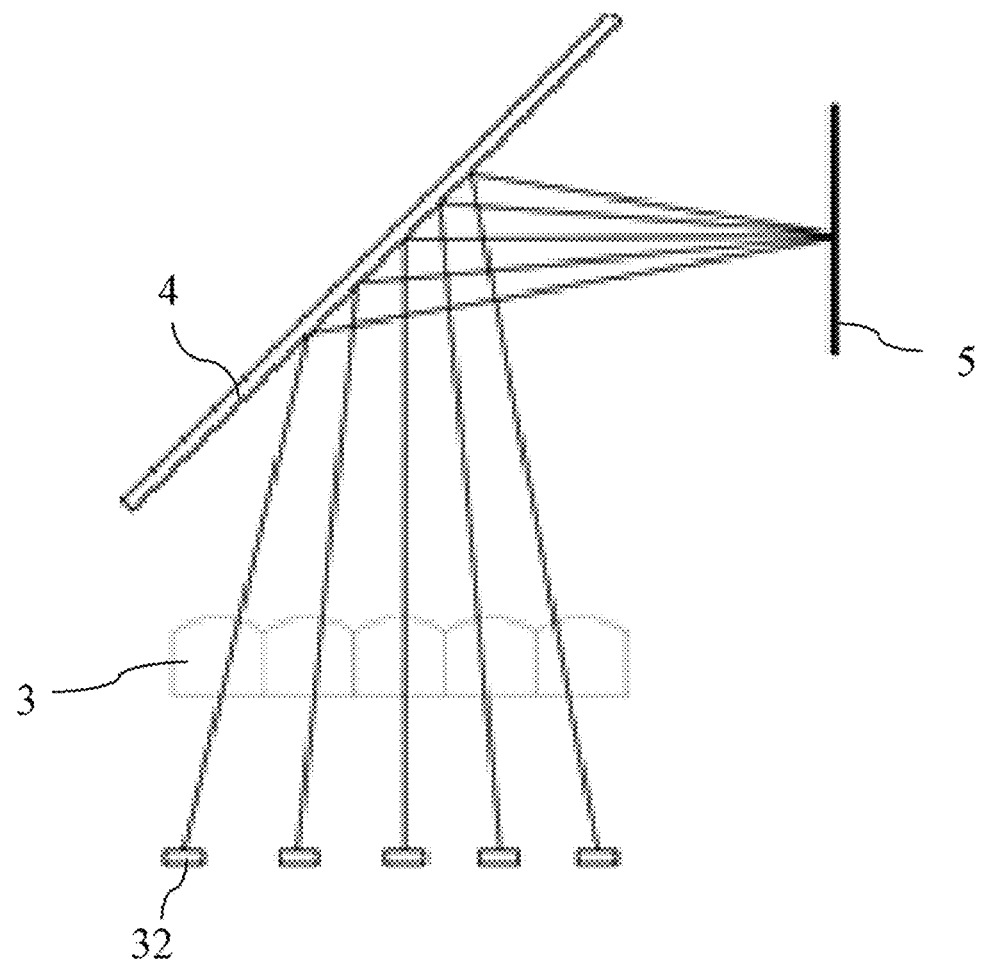
FIG. 19 shows an imaging principle of an air imaging apparatus for a vehicle according to the fifth embodiment of the present disclosure.

The difference between this embodiment and the preceding five embodiments is that the image source 1 comprises more than one light emitting source 32, the plurality of light emitting sources 32 being arranged in a array such that the graphics presented by different light emitting sources 32 may be tuned during use based on the graphics that need to be displayed, thereby achieving a better display effect. In the case that the plurality of light emitting sources 32 (e.g., a display group formed by a plurality of LCD displays) work in cooperation with the lens array described in the third embodiment, as shown in FIG. 19, the plurality of light emitting sources 32 may also be arranged in an array, wherein the number of the light emitting sources 32 may be identical to the number of the lenses in the lens array, or may be different therefrom.

Seventh Embodiment

Figure 20:
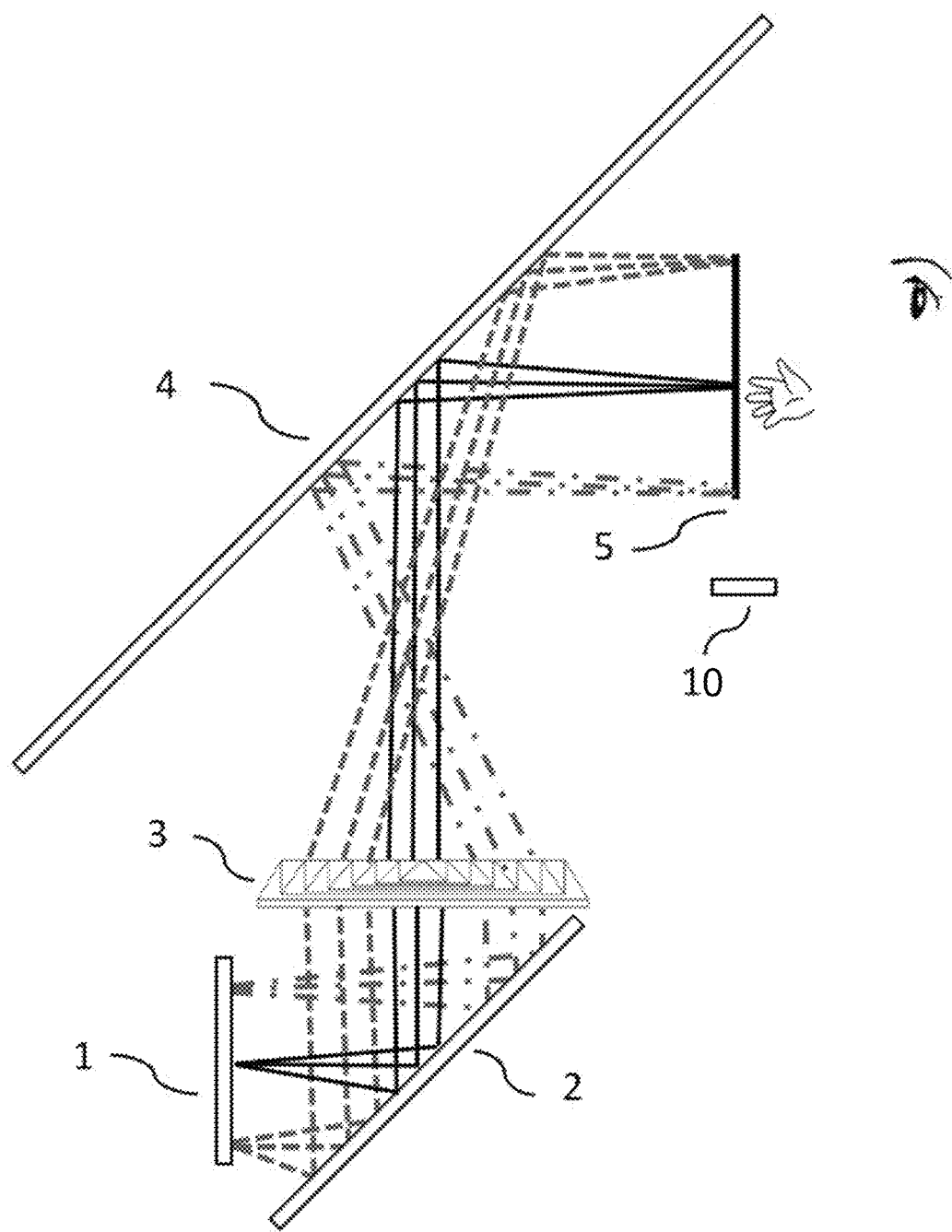
FIG. 20 shows an imaging principle of a human-machine interactive in-vehicle assistance system according to the present disclosure.
Figure 21:
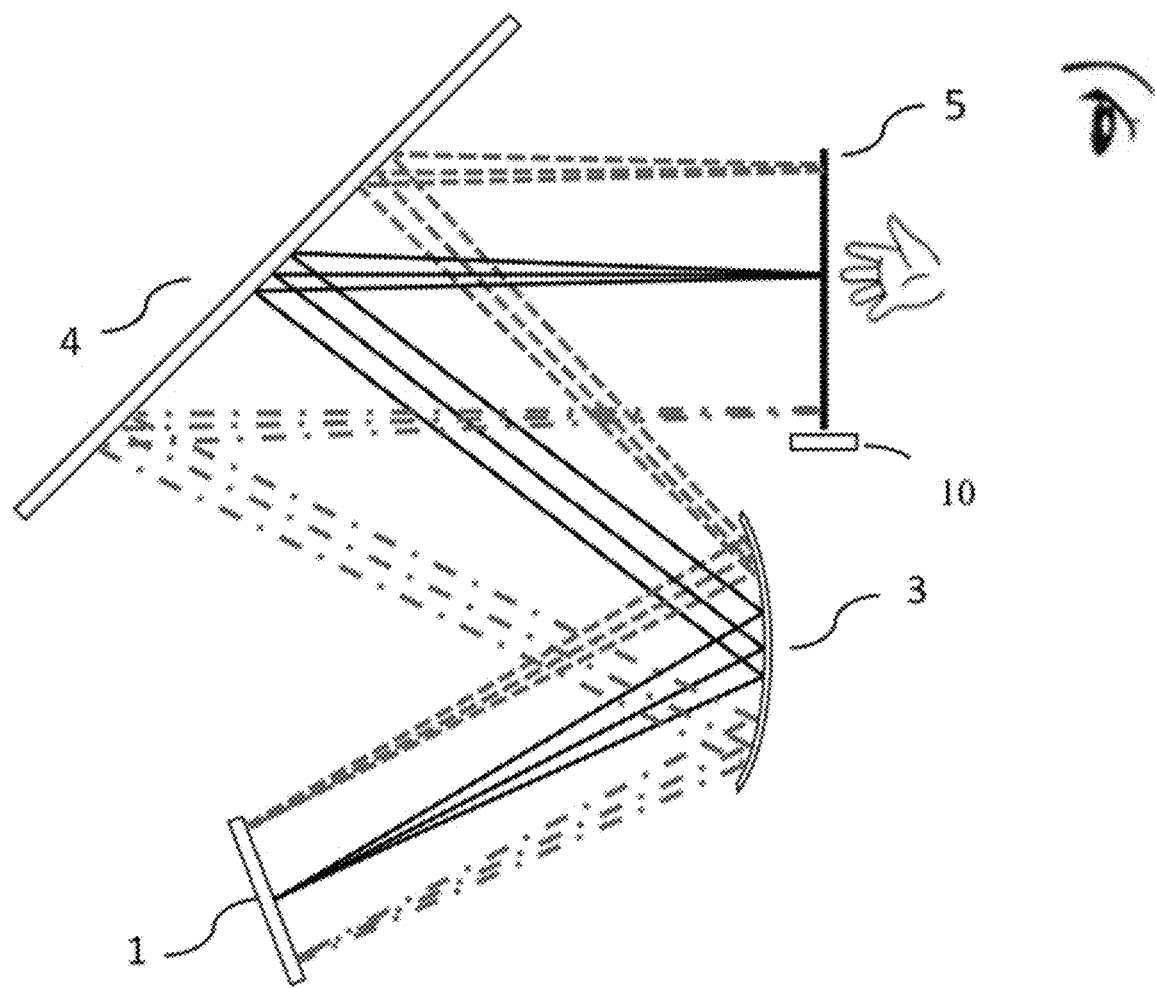
FIG. 21 shows an imaging principle of the human-machine interactive in-vehicle assistance system in the case of adopting a reflective imaging magnifier according to the present disclosure.

As shown in FIG. 20 and FIG. 21, a human-machine interactive in-vehicle assistance system is provided, comprising an air imaging apparatus for vehicle according to any of first through sixth embodiment, and a gesture recognition apparatus 10 disposed nearby the formed real image 5. The specific position of the gesture recognition apparatus 10 relative to the real image 5 is determined by the sensitivity of the gesture recognition apparatus and the mounting platform. The gesture recognition apparatus 10 is configured to determine which command operation in the current image to be executed by the user. With the enlarged image, the icons representing the commands are also enlarged. As such, the gesture recognition apparatus 10 can easily identify which command icon is touched by the user's gesture. Moreover, when the user performs a gesture sliding operation, due to the corresponding enlargement of the gesture sliding distance, the precision requirement on the gesture recognition apparatus 10 is significantly lowered, such that the gesture recognition apparatus 10 can recognize the user's intended operation more accurately, thereby enhancing user experience.

A voice recognition apparatus may be additionally provided, such that when the user sees the real image 5 formed by the air imaging apparatus for vehicle, the user may express the operation command intended to be executed, which enhances the user experience.

In general, the image source 1 should be protectively installed in the vehicle dashboard, while the imaging magnifier 3 is generally installed in the dashboard. A window for light to exit is provided on the dashboard, and a transparent element such as glass may be provided for the window to protect the imaging magnifier. The gesture recognition apparatus 10 for recognizing user's hand operation command is generally installed in the dashboard nearby the real image 5 or on the roof in the vehicle above the real image 5.

A first embodiment of the gesture recognition apparatus adopts an infrared camera. The light emitted from the image source, after passing through the image magnifier, is refocused to form a real image in the air. By tuning the distance and orientation, the infrared camera is enabled to superimpose the sensed gesture scope with the real image. Then, by recognizing the gesture with the infrared camera, an ECU (Electronic Control Unit) is enabled to control the image from the image source to perform a corresponding action, e.g., zooming in, zooming out, rotating left-right or top-down, selecting, returning, etc.

In the embodiments of the present disclosure, the infrared camera may adopt a Leap Motion gesture recognition camera. The ECU may be an in-vehicle controller, or any currently available electronic control unit with a high-definition video output interface and a USB port.

The infrared camera may be any model of gesture recognition camera to recognize the operator's gesture and transmit a signal to the ECU.

Leap Motion Controller is a kinetic controller developed for PC, Mac, and ECU, which was released by Leap Motion Company, a kinetic controller manufacturer, on Feb. 27, 2013. The Leap Motion Controller does not replace keyboards, mouse, writing pads or touch pads, instead, it works in coordination with them. When Leap Motion software is running, it only needs to insert the Leap Motion Controller into a Mac, a PC or connect it to the in-vehicle ECU compatible with the Leap Motion Controller, and then everything is ready. Without a need to modify or edit the program, movement of a finger suffices for daily computer operations such as browsing webpages, reading articles, viewing pictures, and playing music, etc.

A second embodiment of the gesture recognition apparatus adopts a 3D capacitive gesture recognition module. After the light emitted from the image source passes through the imaging magnifier, it is refocused to form a real image in the air. After tuning of the distance and orientation, the 3D capacitive gesture recognition module is enabled to superimpose the sensed gesture scope with the real image. Then, by recognizing the gesture with the 3D capacitive gesture recognition module, the ECU may control the image from the image source to perform a corresponding action, e.g., zooming in, zooming out, rotating left-right or top-down, selecting, returning, etc.

In the embodiments of the present disclosure, the 3D capacitive gesture recognition module adopts the Microchip mcg 3140 chip. The ECU may be an in-vehicle controller, or any currently available electronic control unit with a high-definition video output interface and a USB port.

The mcg 3140 chip is a gesture recognition chip developed by Microchip specifically for vehicles, which is certified as AEC Q100 Grade 1. Therefore, it can be easily installed for pre-market or after-market. The detection distance is about 30 cm. With an appropriate design, it can completely meet system requirements.

A third embodiment of the gesture recognition apparatus adopts a millimeter-wave radar gesture recognition module. After the light emitted from the image source passes through the imaging magnifier, it is refocused to form a real image in the air. After tuning of the distance and orientation, the millimeter-wave radar gesture recognition module is enabled to superimpose the sensed gesture scope with the real image. Then, by recognizing the gesture with the millimeter-wave radar gesture recognition module, the ECU may control the image from the image source to perform a corresponding action, e.g., zooming in, zooming out, rotating left-right or top-down, selecting, returning, etc.

In the embodiments of the present disclosure, the millimeter-wave radar gesture recognition module adopts the TI awr 1642 chip. The ECU may be an in-vehicle controller, or any currently available electronic control unit with a high-definition video output interface and a USB port.

The awr 1642 chip is a gesture recognition chip developed by TI specifically for vehicles, which has passed the AEC Q100 certification. Therefore, it can be easily installed for pre-market or after-market. Besides, it is insusceptible to influences from ambient light and severe weather and thus can be used in all weathers.

What have been discussed above are only preferred embodiments of the present disclosure. However, the technical features of the present disclosure are not limited thereto. Any change or modification made by a person of normal skill in the art should be covered in the scope of the present disclosure.

What is claimed is:

1. An in-vehicle air imaging apparatus for a vehicle, comprising:
    an image source configured for generating a graphic for display; and
    an imaging magnifier configured for magnifying the graphic generated by the image source and forming a virtual image in the air inside the vehicle,
    wherein the imaging magnifier is a Fresnel lens group comprising at least two Fresnel lenses arranged in parallel, each of the Fresnel lenses comprising a substrate and straight teeth arranged in parallel on the substrate, the straight teeth of one Fresnel lens being not parallel to the straight teeth of its neighboring Fresnel lens.

2. The in-vehicle air imaging apparatus for the vehicle according to claim 1, wherein the imaging magnifier is selected from a group consisting of: a Fresnel lens, a binary diffractive lens, a spherical lens, an aspherical lens, a free-formed surface lens or a flat panel micro lens.

3. The in-vehicle air imaging apparatus for the vehicle according to claim 1, wherein the straight teeth of one Fresnel lens are arranged to be perpendicular to the straight teeth of its neighboring Fresnel lens.

4. The in-vehicle air imaging apparatus for the vehicle according to claim 1, wherein a ridge line is arranged at the top end of each of the straight teeth distant from the substrate, the ridge line being a straight line parallel to the substrate.

5. The in-vehicle air imaging apparatus for the vehicle according to claim 4, wherein the straight teeth are of a triangular-prism shape with one side being closely attached to the substrate.

6. The in-vehicle air imaging apparatus for the vehicle according to claim 4, wherein the cross section of each of the straight teeth includes a base and two sides, the base and the two sides being joined end to end, the base being closely attached to the substrate, one of the two sides being an arc, and the other side being an arc or a straight line.

7. The in-vehicle air imaging apparatus for the vehicle according to claim 1, wherein two neighboring Fresnel lenses are oppositely arranged; or, two neighboring Fresnel lenses are arranged in the same direction; or two neighboring Fresnel lenses are arranged facing away from each other.

8. The in-vehicle air imaging apparatus for the vehicle according to claim 1, wherein the two Fresnel lenses are closely attached together.

9. The in-vehicle air imaging apparatus for the vehicle according to claim 1, wherein the imaging magnifier is a lens array, comprising a plurality of lenses, all of the lenses being arranged in a matrix.

10. The in-vehicle air imaging apparatus for the vehicle according to claim 9, wherein the lens is a micro lens or a Fresnel lens.

11. The in-vehicle air imaging apparatus for the vehicle according to claim 1, wherein the imaging magnifier is selected from the group consisting of a Fresnel reflector, a binary diffractive reflector, a spherical reflector, an aspherical reflector, or a free-formed surface reflector.

12. The in-vehicle air imaging apparatus for the vehicle according to claim 1, further comprising a first reflector, disposed in an optical path between the image source and the imaging magnifier.

13. The in-vehicle air imaging apparatus for the vehicle according to claim 12, further comprising a second reflector disposed in an optical path between the imaging magnifier and the virtual image.

14. The in-vehicle air imaging apparatus for the vehicle according to claim 13, wherein the second reflector is a vehicle windshield.

15. The in-vehicle air imaging apparatus for the vehicle according to claim 14, wherein a position corresponding to the imaging magnifier on the vehicle windshield is provided with a wedge-shaped glass.

16. The in-vehicle air imaging apparatus for the vehicle according to claim 1, wherein the image source comprises one or more light emitting sources.

17. The in-vehicle air imaging apparatus for the vehicle according to claim 16, wherein if the image source comprises a plurality of light-emitting sources, the light emitting sources are arranged in a matrix.

18. The in-vehicle air imaging apparatus for the vehicle according to claim 16, wherein the imaging source is selected from the group consisting of: an LCD, an LED, an OLED, an LCOS, or a projector.

19. The in-vehicle air imaging apparatus for the vehicle according to claim 18, wherein the projector is a digital light processing (DLP) projector or a laser MEMS module, and a diffuser is additionally provided between the projector and the imaging magnifier.

20. The in-vehicle air imaging apparatus for the vehicle according to claim 19, wherein a transmittance of the diffuser is 70%±10%.

21. The in-vehicle air imaging apparatus for the vehicle according to claim 1, wherein a size of the imaging magnifier is greater than a size of the formed virtual image.

22. A human-machine interactive in-vehicle assistance system, comprising the in-vehicle air imaging apparatus according to claim 1, and a gesture recognition apparatus nearby the virtual image.

23. The human-machine interactive in-vehicle assistance system according to claim 22, wherein the human-machine interactive in-vehicle assistance system further comprises a voice recognition apparatus that captures user's voice and a display content of the virtual image.

24. The human-machine interactive in-vehicle assistance system according to claim 22, wherein the image source is installed in a dashboard of the vehicle, the imaging magnifier is installed in the dashboard, the gesture recognition apparatus is mounted on the dashboard nearby the virtual image or on a roof in the vehicle.

* * * * *